United States Patent [19]

Gavaskar

[11] Patent Number: 6,044,377

[45] Date of Patent: Mar. 28, 2000

[54] USER-DEFINED OBJECT TYPE AND METHOD OF MAKING THE OBJECT TYPE WHEREIN A FILE ASSOCIATED WITH A RULE IS INVOKED BY ACCESSING THE FILE WHICH GENERATES CODE AT RUN TIME

[75] Inventor: Vivek N. Gavaskar, Cupertino, Calif.

[73] Assignee: Sun Microsystem, Inc., Mountain View, Calif.

[21] Appl. No.: 08/554,444

[22] Filed: Nov. 7, 1995

[51] Int. Cl.$^7$ ..................................................... G06F 17/30
[52] U.S. Cl. .................................. 707/103; 707/2; 707/3; 707/205; 395/674
[58] Field of Search ..................................... 395/621, 709, 395/183.08, 617, 612, 619, 601, 551, 800, 419, 701, 707, 706, 674, 703; 364/55.01, 578; 370/363; 707/203, 205, 2, 3, 103

[56] References Cited

U.S. PATENT DOCUMENTS

| | | | |
|---|---|---|---|
| 4,558,413 | 12/1985 | Schmidt et al. | 707/203 |
| 4,761,737 | 8/1988 | Duvall et al. | 395/419 |
| 4,791,628 | 12/1988 | Burns et al. | 370/363 |
| 4,875,159 | 10/1989 | Cary et al. | 395/619 |
| 4,885,684 | 12/1989 | Austin et al. | 395/706 |
| 5,031,124 | 7/1991 | Bosinoff et al. | 364/555.01 |
| 5,113,519 | 5/1992 | Johnson et al. | 395/617 |
| 5,218,695 | 6/1993 | Noveck et al. | 707/205 |
| 5,339,419 | 8/1994 | Chan et al. | 395/707 |
| 5,367,698 | 11/1994 | Webber et al. | 395/800 |
| 5,386,562 | 1/1995 | Jain et al. | 395/709 |
| 5,388,257 | 2/1995 | Bauer | 395/601 |

(List continued on next page.)

FOREIGN PATENT DOCUMENTS

0602932A2 12/1993 European Pat. Off. ..................... 9/62

OTHER PUBLICATIONS

DiCesare et al. "A Code Generation Tool for Simulation and Control, Based on Colored Petri Nets", IEEE Systems, Man, and Cybernetics, 1995 Conf., v. 4, p3063–3068.

Benaya et al. "An Application Generator for a Family of Real–Time Monitor and Control Systems", IEEE Compeuro '90 Computer and Systems Software, p. 274–279, 1990.

Willems et al. "Fine Grain Code Synthesis within a Block Diagram Oriented Code Generation Environment", IEEE ICASSP '95 Acoustics, Speech, & Signal Processing Conf., v. 4, p. 2647–2650, 1995.

Saghir et al. "Application–Driven Design of DSP Architectures and Compilers", IEEE ICASSP '94 Acoustics, Speech, & Signal Processing, v. 2, p. II437–II–440, 1994.

Maurer et al. "Gateways: A Technique for Adding Event–Driven Behavior to Compiled Simulations", IEEE Transactions on Computer–Aided Design of Integ. Circuit, v. 13, n. 3, p. 338–352, Mar. 1994.

Plaice et al. "A Unix Tool for Managing Reusable Software Components", Software Practice and Experience, v. 23, n. 9, p. 933–948, Sep. 1993.

Oldaker et al. "An Integrated Package for the Simulation and Practival Evaluation of Discrete Control Systems Running with the MATLAB Environment", IEEE Colloquim on Applied Control Techniques Using MATLAB, p. 7/1–3, Jan. 1995.

Wade, Andrew E. "The ODBMS Role in 64 bit Ditributed Client–Server Computing", Electro/94 Int'l Conference Proceedings, Combined Volumes, p603–608, May 10, 1994.

*Primary Examiner*—Thomas G. Black
*Assistant Examiner*—Charles L. Rones
*Attorney, Agent, or Firm*—Blakely Sokoloff Taylor & Zafman

[57] ABSTRACT

A new user-defined object type and method of making the object type. A new object type is an m-file. M-files are files which require very little physical storage space, but appear to active processes to be a predetermined size up to the maximum user supported file size. A rule is associated with a unique file identifier such that any access of the file is also an invocation of the rule transparent to the requesting application. The rule generates code to fill the requested block of the requested file.

20 Claims, 4 Drawing Sheets

U.S. PATENT DOCUMENTS

| | | | |
|---|---|---|---|
| 5,442,781 | 8/1995 | Wrabetz et al. | 395/674 |
| 5,454,103 | 9/1995 | Coverston et al. | 395/621 |
| 5,463,772 | 10/1995 | Thompson et al. | 395/612 |
| 5,483,655 | 1/1996 | Auricchio et al. | 395/601 |
| 5,488,573 | 1/1996 | Brown et al. | 364/578 |
| 5,493,682 | 2/1996 | Tyra et al. | 395/703 |
| 5,519,853 | 5/1996 | Moran et al. | 395/551 |
| 5,572,666 | 11/1996 | Whitman | 395/183.08 |
| 5,574,903 | 11/1996 | Szymanski et al. | 395/601 |
| 5,664,189 | 9/1997 | Wilcox et al. | 707/205 |
| 5,682,535 | 10/1997 | Knudsen | 395/701 | m-files: Method/rule based files

400

A Regular File

Block0, Block1 ... BlockN

401

M-File

Block[i] = Method(i)

USER-DEFINED OBJECT TYPE AND METHOD OF MAKING THE OBJECT TYPE WHEREIN A FILE ASSOCIATED WITH A RULE IS INVOKED BY ACCESSING THE FILE WHICH GENERATES CODE AT RUN TIME

BACKGROUND OF THE INVENTION

(1) Field of the Invention

The invention relates to addition of a new object type to operating systems. More specifically, the invention relates to addition of an object type to standard operating systems wherein the object type is a file which, rather than having physical data associated therewith, has an associated rule which is used to generate the data when the object type is accessed.

(2) Prior Art

Operating systems are generally well-known in the art. The operating system is responsible for controlling the allocation usage of hardware resources throughout the computer system. Simple popular operating systems exist including MS-DOS™, the Macintosh™ OS, OS/2™, Windows™, and UNIX™. The kernel is the core of an operating system which is responsible for the allocation of system resources. A typical kernel for a UNIX™ file server contains standard code known as the UNIX™ File System (UFS) which is coupled to a disk driver for providing block access to the bulk storage unit. The UFS also interacts with standard file sharing software. The file sharing software provides files to an Ethernet driver which then drives the files over an Ethernet connector to the target or client system. The target or client operating system's kernel typically has these same components.

The UFS translates requests for files from an application program into low level, sector-oriented tasks which can be understood by the drivers. The file server is a device that stores, manages, and maintains files on a local area network (LAN) allowing target or client machines to access files through the server machine. Traditional files are a collection of physical data which requires storage space equal to the file size. Accordingly, traditional files are limited by two constraints, (i) the amount of bulk storage available on the server, and (ii) the number of address bits allotted to user address space. In many current systems, the second criterion limits file size to two gigabytes. However, as a practical matter, very few systems accommodate two gigabytes of physical storage. Moreover, traditional code preparation methods make writing and debugging of code of such a large volume impractical. Difficulties in creating very large files create certain problems specific to a test environment.

In the test environment, it is desirable to stress the item under test, be it hardware or software, in terms of speed, volume and/or sequence of operations to be performed. In view of the fact that files of large size, for example, greater than one gigabyte, are difficult to create and require large amounts of physical storage, it has been difficult or impossible to test with any reliability the ability of file servers and file handlers to handle such large files, much less paging and memory mapping and other manipulation of such files. Moreover, as instruction sets become larger, it becomes increasingly difficult to test all the possible combinations and sequences of instructions such that a systems designer can be more than reasonably sure that the system will operate properly given any series of instructions from the instruction set.

Therefore, it would be desirable to develop a system and method whereby large files can be effected without the need for vast bulk storage facilities or the time and effort required to code and debug large blocks of executable code. Moreover, it would be desirable if the files created readily interface with existing architectures and operating systems.

BRIEF SUMMARY OF THE INVENTION

A new user-defined object type and method of making the object type is disclosed. A new object type is an m-file. M-files are files which require very little physical storage space, but appear to active processes to be a predetermined size up to the maximum user supported file size. A rule is associated with the unique file identifier such that any access of the file is also an invocation of the rule transparent to the requesting application. The rule generates code to fill the requested block of the requested file.

M-files can be created using a feature of many operating systems whereby given a file name and a file size, data can first be written at some distance from the start of file. The distance between the start of the file and the first writer data is a hole, in UNIX™, a UFS hole. In UNIX™, the hole would typically be filled with zeros on the read of the corresponding block. However, by associating a rule of the unique file identifier such as an inode number, and maintaining a record of that association, the rule can be invoked responsive to subsequent requests of the read block. A pseudo driver is provided to perform hole handling functions. This allows the standard file system to be modified only minimally. The pseudo-driver identifies incoming requests for blocks within a hole as either m-file hole blocks or regular file hole blocks. In the case of an m-file hole, the pseudo-driver passes the block number as a parameter to the associated rule and invokes the rule. Once invoked, the rule generates code to fill the block corresponding to the parameter passed. Alternatively, if the pseudo-driver determines that the requested file is not within the m-file, then hole handling can be passed back to the standard file system or the pseudo-driver can return a block of zeros.

In a test environment, m-files allow a machine under test to be stressed in ways not previously possible. Very large files can be generated very rapidly without the storage constraints of regular files. Moreover, because there is no necessity to write and debug m-file code, large numbers of instruction sequences can be generated to test hardware and even lower level system software.

DETAILED DESCRIPTION OF THE INVENTION

A method and apparatus for providing a new user defined object type is disclosed. In the following description for purpose of explanation, specific applications, numbers, materials and configurations are set forth in order to provide full understanding of the present invention. However, it would be apparent to one skilled in the art that the present invention may be practiced without the specific details. In other instances, well known systems are shown in diagrammatical or block diagram form in order not to obscure the present invention unnecessarily.

Figure 1:
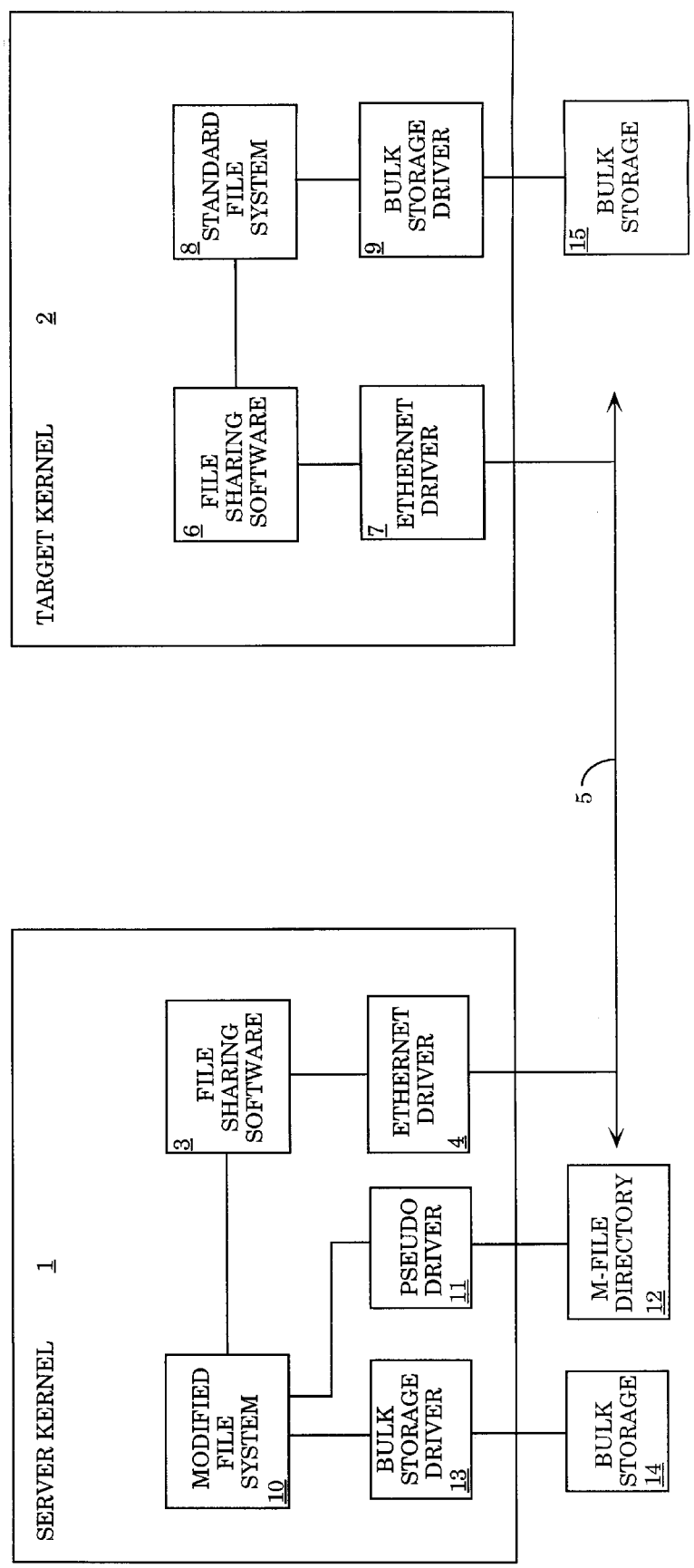
FIG. 1 is a block diagram of a server kernel target kernel used in the instant invention.

FIG. 1 shows a block diagram of a server kernel 1 adapted to use the new object type. The server kernel 1 is connected via an Ethernet connection 5 to a target kernel 2 which in all respects conforms to existing systems. The remainder of this description will focus on a UNIX™ environment, however, it would be apparent to one of ordinary skill in the art that the teachings are not so limited, but rather could be expanded to any operating system environment.

The target kernel 2 is connected to a bulk storage device 15 and accesses the bulk storage device 15 through a standard bulk storage driver 9 coupled to a standard file system 8. In a UNIX™ environment, the standard file system is the UNIX™ File System (UFS). In a network environment, it is also necessary to have some form of file sharing software 6 to allow the target kernel 2 to share software with the server or other device on the network. The network file system (NFS) is a commonly used file sharing software 6 for the UNIX™ environment. To provide for communication over an Ethernet connection, a standard Ethernet driver 7 is also provided.

The server kernel 1 mirrors the target kernel 2 in many respects. The server kernel employs a standard Ethernet driver 4, file sharing software 3, and bulk storage driver 13 which is coupled to a standard bulk storage unit 14. However, the server kernel 1 contains a modified file system 10 or modified UFS in the UNIX™ environment which is coupled to a pseudo driver 11. The pseudo driver 11 is responsible for maintaining and driving a directory 12 containing the user defined object types. In FIG. 1, the user defined object type is the m-file. Accordingly, the described pseudo driver 11 maintains an m-file directory 12 and provides access to requested m-files.

An m-file is a file of the defined size with an associated rule. The rule accepts as a parameter the block numbers of the file requested and generates code for each block as defined by the rule. Thus, depending on the block to be filled, different subrules may be invoked to generate the code. Creation and execution of m-file is detailed more fully below. Significantly, to the modified file system 10 and any target kernel 2, the m-file appears to be a regular file. The generation of the actual code defined by the rule is transparent to the rest of the system. The pseudo driver 11 exploits a feature of UNIX™, the UFS hole. Most other operating systems support similar functionality. UNIX™ allows data to be written at a distance from the start of file address. The space between the start of file and the written data constitute a UFS hole. Normally, a standard file system 8 fills holes with zeros. To implement the m-files, the holes are filled with run time generated code as will be discussed more fully below. The UFS file system is an extensive and uniform program. It is desirable to change the file system as little as possible to support the new object types. Therefore, the code introduced to the modified file system 10 merely redirects control of the hole filling algorithm to the pseudo driver 11 when a pseudo driver 11 is connected. In an exemplary embodiment, the pseudo driver 11 is implemented as a RAM disk, the RAM disk being generated at startup by an executable file which associates the m-files with rules stored in text files.

Figure 2:
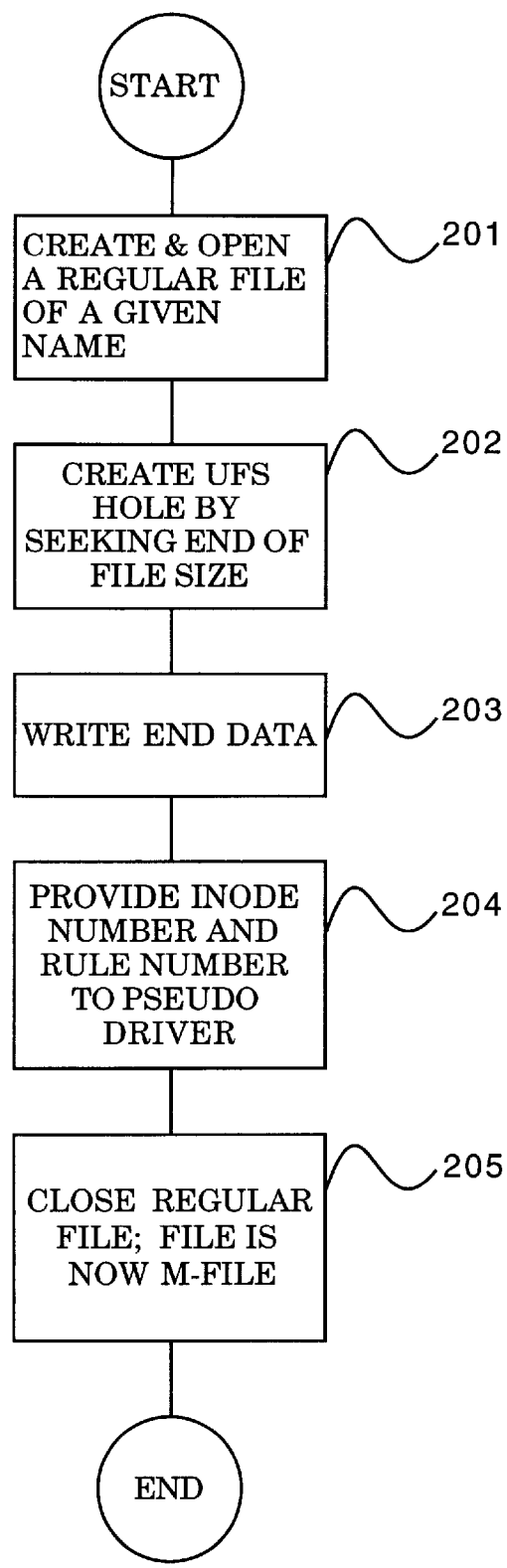
FIG. 2 is a flow diagram of how an m-file is created.

FIG. 2 is a flowchart showing creation of an m-file. The creation begins at functional block 201 by opening a regular file of a given name, Filename. The next step is to create a UFS hole at functional block 202. A UFS hole is created by seeking the end of Filename, having a predetermined file size. This file size can be any file size supported by the user address space. In most existing systems, the maximum supported file size is two gigabytes. However, the described method works at any file size up to whatever maximum file size is supported by the system. Creation of a UFS hole requires that something be written to the file at a distance from the start of the file. Accordingly, after seeking the end of the file size, some end data is written at that location, at functional block 203. The end data must be at least one byte to establish a UFS hole, though multiple bytes may be written. The amount of end data written dictates the physical storage required by the m-file.

Every file on a file system has an inode number which uniquely identifies the file. In functional block 204, file names, inode number and the rule number with which it is to be associated are provided to the pseudo driver. In one embodiment, this is done by issuing an ioctl to the pseudo driver. The pseudo driver then stores the association between the inode number and the rule number. Finally, in functional block 205, the regular file, Filename, is closed. The file in now an m-file, and any subsequent attempts to access the file, Filename, while the pseudo driver is installed in the server machine will result in code generated by the rule associated with the inode number.

Figure 3:
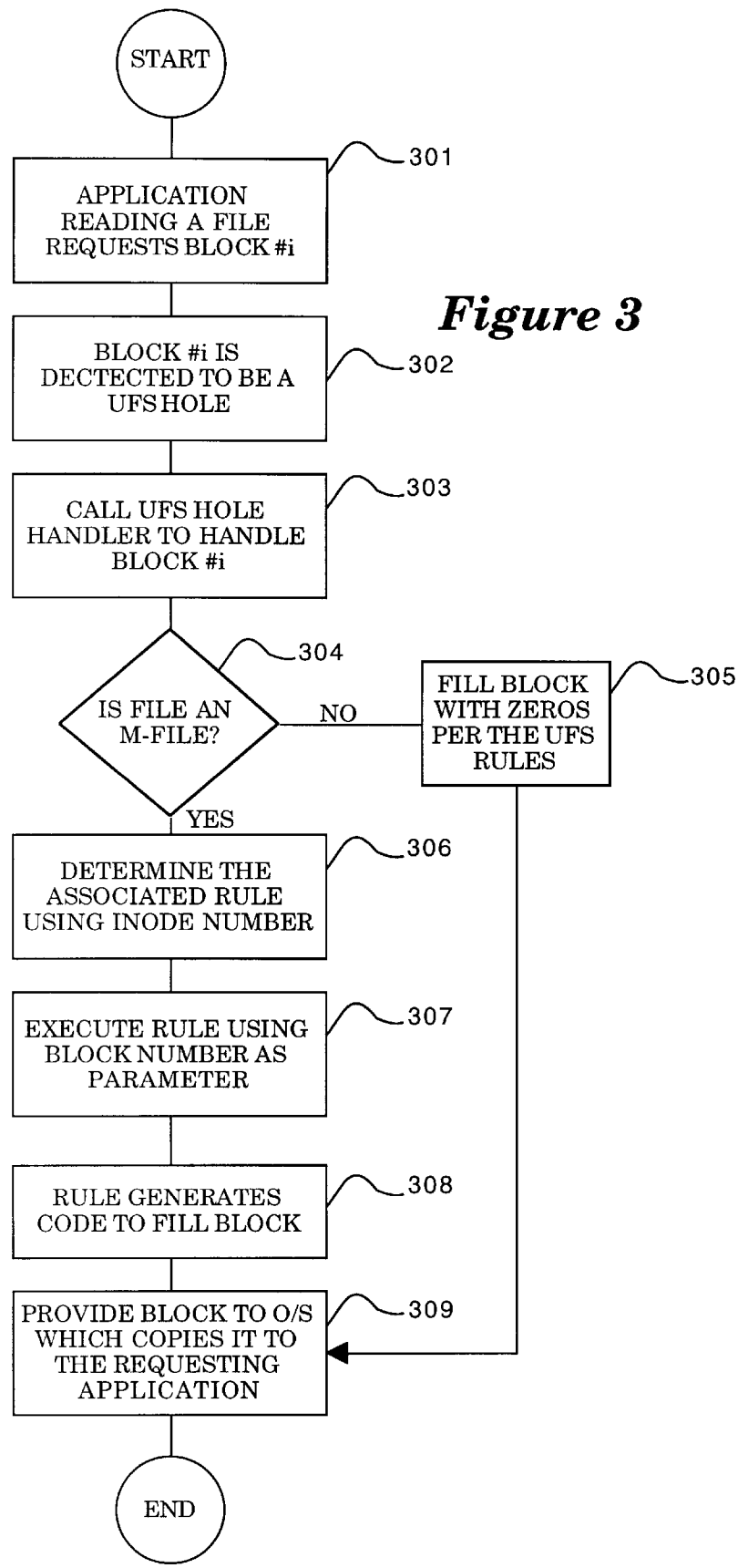
FIG. 3 is a flow diagram of how m-files are handled by the modified file system of the invention.

FIG. 3 is a flow diagram showing the flow of a request for a particular file between the target machine and the server machine. In functional block 301, the target machine begins reading a file, Filename, and requests block i of Filename. The request goes to the file sharing software which sends it via the Ethernet driver to the server kernel. In functional block 302, block i is determined to be a UFS hole. If block i is not a UFS hole, then it is a regular file serviced in the regular way. If block i is a UFS hole, the modified file system 10 calls the UFS hole handler to handle block i, at functional block 303. When the pseudo driver is connected, all hole handling is automatically forwarded to the pseudo driver. The pseudo driver carries on hole handling responsibilities transparent to an accessor application, the target machine and even the server file system. Decision box 304 corresponds to a determination of whether the UFS hole is part of an m-file. The inode number of the hole containing an m-file is maintained with a rule pairing in the pseudo-driver. If the pseudo driver is not connected, there can be no association of rules to UFS holes; therefore, this decision will always result in a "no" when the pseudo driver is not connected. The standard UFS file system hole handler routine always fills hole blocks with zeros. Thus, if no rule is associated with the UFS hole, normal filing procedures apply and the block should be filled with zeros in functional block 305. The block of zeros is then provided to the operating system which copies it to the requesting application in the normal way in block 309.

If the block is determined to be an m-file, the pseudo driver uses the inode number to determine the associated rule in block 306. In block 307, the pseudo driver uses the block number as a parameter and executes the rule. As discussed above, the "rule" can be a rule built into the pseudo driver or in the form of prologue, body and epilogue supported by the pseudo driver. Different subrules will apply depending on the block number path. If the rule takes the prologue, body and epilogue form, the epilogue is usually the end data which is physically written to the file to create the hole. In functional block 308, the rule using the block number as a parameter generates code to fill the requested block. The block can then be returned to the requesting application in functional block 309 as would be any other block of physical data from a regular file.

Figure 4:
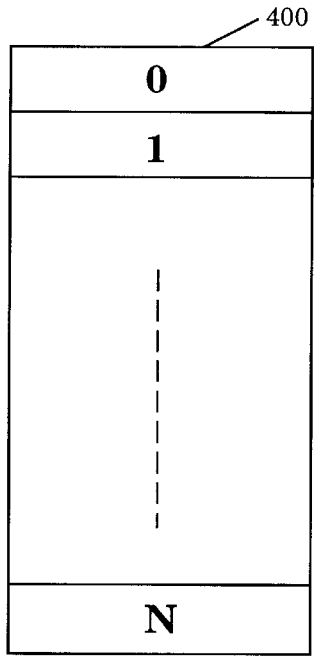
FIG. 4 is a block diagram showing the relationships between a regular file and an m-file.
Figure 4:
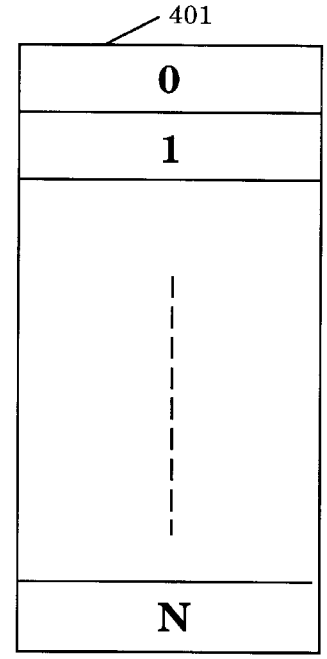

FIG. 4 shows a regular file 400 and an m-file 401 of equal size. As previously discussed, a regular file 400 is a collection of data. The application creating a regular file writes data to all the blocks in the file. Accordingly, the file system physically stores this data on a storage device such as bulk storage device 14 as shown in FIG. 1. For each block, there is a physical storage location in, for example, the bulk storage device 14 which must be accessed. The data is passed by the bulk storage driver 13 to an operating system which copies it over an Ethernet connection 5 to a requesting kernel 2. Conversely, method file 401 as described above merely requires a few bytes of physical storage because there is no data physically written to the device. When a request for a particular block of an m-file comes to a modified file system 10, the pseudo driver 11 invokes the associated rule in which the block number i serves as a parameter. The physical data to build the block i is computed at run time. Entire operation is transparent to both the target kernel 2 and the operating system of the server kernel 1 in view of the fact that data retrieval technology is very slow compared to currently existing CPU operating speeds. It has been determined that less time is required to generate a block at run time than to retrieve a block from bulk storage. This feature provides additional benefits in allowing testing of high speed file handling.

The new object type is particularly beneficial in a test environment. In the test environment, a premium is put on stressing the item under test in as many ways as possible. User programs running on machines under test, map these m-files in their address space and execute the m-file code as if making a function call. M-files allow testing of large text mappings and systems software code that supports memory mapping, map permissions, boundary conditions in memory management and paging. The m-files may also be used for testing low level system software or hardware. M-files allow for generation of large amounts of code very rapidly. Moreover, because m-files are unconstrained by the physical storage limitations of regular files, the ability of the device or system to handle large files and even large numbers of large files can be easily tested using m-files. By way of example, a rule associated with a method file may generate code which calculates the address of the next page and jumps there. By making a file arbitrarily large up to the maximum supported user file size, a vast number of page faults can be generated in rapid succession. Accordingly, such rule can be effectively used to test the page fault handling capabilities of the target system.

In the development of a new instruction set or a new chip set, extensive testing of as many sequences of different instructions within the instruction set supported is required. As the instruction set increases in size, the number of possible combinations and sequences of operations quickly becomes prohibitively large such that physically writing test sequences for the myriad of different possibilities becomes impossible. By employing a rule which generates instructions from a specified subset of the instruction set or the entire instruction set, successive executions of an associated file in excess of a gigabyte make possible the testing of many more possible sequences than could be tested using conventional testing methods. Because the storage space required by rules are on the order of a few thousand bytes, yet association with a file of two gigabytes yields two gigabytes of executable code without incurring the storage limitation or difficulty associated with coding and debugging large files conventionally, m-files permit much more thorough testing than any previously known technique.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method of generating code at run time comprising:
   associating a file name with a rule; and invoking the rule in response to a read of the file, the rule generating code.

2. The method of claim 1 wherein the rule generates a predetermined volume of code transparently to a reader.

3. The method of claim 2 wherein a physical storage requirement of the file is much less than a storage requirement for the generated code.

4. An article of manufacture comprising:
   a computer readable medium having encoded thereon:
   a file associated with a rule which is invoked by accessing the file, the rule generating code at run time, and wherein the code generated fills a UNIX hole.

5. An article of manufacture comprising:
   a computer readable medium having encoded thereon:
   a file associated with a rule which is invoked by accessing the file, the rule generating code at run time.

6. The article of manufacture of claim 5 wherein the rule comprises a volume specification mechanism which defines a specific volume of code the rule generates.

7. The article of manufacture of claim 5 wherein the rule comprises a transparent generation mechanism such that the code is generated transparent to all accessors.

8. The object type of claim 5 wherein a physical storage required to store the object uncompressed is much less than an apparent size of the object.

9. A computer system comprising:
   a server machine networked with a target machine;
   a pseudo driver resident in the server machine, the pseudo driver for maintaining an association between a unique file identifier and a rule; and for invoking the rule responsive to an access request for a block of a file corresponding to the unique file identifier.

10. The system of claim 3 wherein a code block is generated to fill a block of the file as defined by the associated rule when the block of the file is accessed.

11. The system of claim 10 wherein the file comprises a hole and an end data.

12. The system of claim 11 wherein hole handling in the system is conducted by the pseudo driver.

13. The system of claim 9 wherein the file can be any size up to a maximum user address space allowed in the system.

14. A method of creating file system object type comprising the steps of:
   opening a regular file;
   writing at least a datum at a predetermined distance from the start of the file thereby creating a hole;
   associating a rule with an identifier unique to the file;
   closing the regular file, wherein the rule is invoked responsive to subsequent openings of the file.

15. The method of claim 14 wherein the step of associating comprises:
   pairing the rule with an inode number of the file; and
   maintaining a record of the pairing.

16. The method of claim 15 wherein when a block of the hole is accessed, a pseudo driver generates code to fill the block.

17. The method of claim 16 wherein the pseudo driver is implemented as a RAM disk.

18. The method of claim 17 wherein generation of code is transparent to an accessor.

19. The method of claim 14 wherein the rule has a prologue, a body and an epilogue.

20. The method of claim 16 wherein the rule fills the block with a plurality of random instructions from an instruction set.

* * * * *